United States Patent
Feuerstein et al.

(10) Patent No.: US 6,178,333 B1
(45) Date of Patent: Jan. 23, 2001

(54) SYSTEM AND METHOD PROVIDING DELAYS FOR CDMA NULLING

(75) Inventors: Martin J. Feuerstein, Redmond; J. Todd Elson, Seattle, both of WA (US)

(73) Assignee: Metawave Communications Corporation, Redmond, WA (US)

(*) Notice: Under 35 U.S.C. 154(b), the term of this patent shall be extended for 0 days.

(21) Appl. No.: 09/060,921

(22) Filed: Apr. 15, 1998

(51) Int. Cl.⁷ ...................................................... A04B 7/00
(52) U.S. Cl. .............................. 455/503; 455/60; 342/373
(58) Field of Search ................................ 455/12.1, 13.2, 455/56.1, 57.1, 59, 60, 63, 65, 33.1, 33.3, 502, 503, 67.3, 67.6, 422, 273, 278.1, 279.1, 62, 438, 443, 444, 277, 504, 561, 562, 277.1, 277.2; 342/373, 374, 372; 370/347

(56) References Cited

U.S. PATENT DOCUMENTS

| | | | |
|---|---|---|---|
| 5,280,472 | * | 1/1994 | Gilhousen et al. ..................... 370/18 |
| 5,423,059 | * | 6/1995 | LoGalbo et al. ..................... 455/51.2 |
| 5,563,610 | * | 10/1996 | Reudink ................................ 342/375 |
| 5,648,968 | * | 7/1997 | Reuldink ............................... 370/335 |
| 5,649,287 | * | 7/1997 | Forssen et al. ....................... 370/312 |
| 5,734,985 | * | 3/1998 | Ito et al. ............................... 455/503 |
| 5,745,841 | * | 4/1998 | Reudink et al. ....................... 455/62 |
| 5,884,147 | * | 3/1999 | Reudink et al. ..................... 455/67.1 |
| 5,889,494 | * | 3/1999 | Reudink et al. ...................... 342/373 |
| 5,917,371 | * | 6/1999 | Chesarek et al. ................. 330/124 R |
| 5,929,823 | * | 7/1999 | Martek et al. ........................ 343/817 |
| 5,930,248 | * | 7/1999 | Langlet et al. ....................... 370/347 |
| 5,963,868 | * | 10/1999 | Back ................................... 455/503 |
| 6,011,977 | * | 1/2000 | Brown et al. ........................ 455/503 |

FOREIGN PATENT DOCUMENTS

| | | | |
|---|---|---|---|
| 0639035 A1 | 2/1995 | (EP) | ................. H04Q/7/36 |
| 0725498 A1 | 8/1996 | (EP) | ................. H04B/7/36 |
| 0777400 A2 | 6/1997 | (EP) | ................. H04Q/7/36 |

\* cited by examiner

Primary Examiner—Daniel S. Hunter
Assistant Examiner—Pablo Tran
(74) Attorney, Agent, or Firm—Fulbright & Jaworski L.L.P.

(57) ABSTRACT

A system and method are disclosed for avoiding nulls in a composite radiation pattern synthesized from a plurality of antenna beams. The disclosed invention teaches the use of delays in the signal paths associated with ones of the antenna beams utilized to synthesize the desired radiation pattern in order to avoid destructive combining of the signals. In a preferred embodiment delays are introduced in each antenna beam signal having a common attribute such as a common phase center. Accordingly, a minimum number of phase differential boundaries are introduced in order that certain communications, such as CDMA, are not adversely affected.

47 Claims, 5 Drawing Sheets

SYSTEM AND METHOD PROVIDING DELAYS FOR CDMA NULLING

REFERENCE TO RELATED APPLICATIONS

Reference is hereby made to the following co-pending and commonly assigned U.S. Patent applications: "CONICAL OMNI-DIRECTIONAL COVERAGE MULTIBEAM ANTENNA WITH MULTIPLE FEED NETWORK," U.S. Ser. No. 08/808,304; "SYSTEM AND METHOD FOR PER BEAM ELEVATION SCANNING," U.S. Ser No. [47586-P006CP3CP1-975460]; "ANTENNA DEPLOYMENT SECTOR CELL SHAPING SYSTEM AND METHOD," U.S. Ser. No. 08/924,285; "MULTI-SECTOR PIVOTAL ANTENNA SYSTEM AND METHOD," U.S. Ser. No. 08/782,051; "MULTIPLE BEAM PLANAR ANTENNA ARRAY WITH PARASITIC ELEMENTS," U.S. Ser. No. 08/896,036; and "SYSTEM AND METHOD FOR FULLY SELF-CONTAINED CALIBRATION OF AN ANTENNA ARRAY," U.S. Ser. No. [4586-P023-974112]; the disclosures of which applications are incorporated herein by reference.

TECHNICAL FIELD OF THE INVENTION

The present invention relates to the simulcasting of signals from a multibeam antenna system and, more particularly, to systems and methods for delaying signals simulcast from various of the multibeams to avoid destructive nulls.

BACKGROUND OF THE INVENTION

It is often desirable to provide a signal simultaneously in multiple beams of a multibeam antenna system. For example, a cellular communication system may provide communications between a base transceiver station (BTS), having an antenna system associated therewith, and a plurality of mobile units operating within a predefined area, or "cell," defined by the antenna system's radiation pattern. Often such cells, although providing communications in a full 360° about the BTS, are broken down into three 120° sectors in order to provide more capacity and less interference over that of an omni cell 360° system. Additionally, such a sectorized cell achieves extended range as compared to an omni cell 360° system due to the greater signal gain at the sector antennas resulting from their more focused coverage.

Further advantage may be realized by providing multiple narrow beams at the BTS rather than the three 120° sectors. For example, twelve 30° narrow antenna beams may be utilized to provide the same 360° communication coverage within the cell as the 360° omni cell configuration and its 120° sectorized cell replacement. Such a multiple narrow beam arrangement is desirable because, as with the 120° sector system described above, the multiple beams provide a greater signal gain resulting from their greater focused coverage. A further advantage of the multiple narrow beams is the flexibility offered in synthesizing any desired sector size. Combining adjacent narrow beams provides a wider composite beam, with a beam width roughly equal to the sum of the individual beams widths. Accordingly, synthesized sectors may be formed of any size from a full 360°, by simulcasting a signal on each of the narrow beams, to as small as the narrow beams themselves, by providing the signal only within one narrow beam.

However, it should be appreciated that there is a potential for phase nulling associated with simulcasting of identical signals within multiple beams. For example, it may be necessary to synthesize a 120° sector pattern comprised of four 30° beams. Conceptually the 120° sector may be synthesized by simply simulcasting the desired signal (CDMA waveform or AMPS signaling channel) over the four contiguous 30° narrow beams making up the desired 120° radiation pattern. However, phase differences between the signals radiated by the four constituent beams can cause signal cancellation. This cancellation leads to undesirable shaping, i.e. "holes," in the composite radiation pattern. For example if the antennas creating the narrow beams are separated by several wavelengths, deep nulls occur in the resulting antenna pattern, giving it a "rippled" appearance azimuthally. This pattern is not desirable for a BTS as it implies that there are "holes" in the coverage corresponding to the nulls in the pattern.

This phase nulling problem created by simulcasting is an artifact of the multibeam approach and is potentially a problem regardless of the type of signal transmitted, i.e., phase nulling is not unique to digital systems such as with respect to dynamic beam mapping in code division multiple access (CDMA) systems, but also exists with respect to signalling in analogue systems such as the advanced mobile phone system (AMPS) and narrowband advanced mobile phone system (NAMPS). Therefore, it is desirable to identify a solution that addresses both CDMA and AMPS/NAMPS. However, due to dynamic beam mapping desirable in CDMA, there may be some unique aspects associated with CDMA.

A need therefore exists in the art for systems and methods by which signals may be provided to a multibeam antenna system for simulcasting over multiple ones of the antenna beams without producing undesirable nulls.

A further need exists in the art for the systems and methods to avoid nulls in the simulcasting over multiple antenna beams of digital signals as well as analogue signals.

A still further need exists in the art for the systems and methods avoiding nulls to be adapted so as not to adversely affect forward link performance.

SUMMARY OF THE INVENTION

These and other objects, features and technical advantages are achieved by a system and method which introduces delays in ones of the simulcast signals in order to provide simulcast signals which do not destructively combine and produce an undesired composite radiation pattern. Time delay elements can smooth the composite antenna beams substantially when the antennas are separated by a significant distance. Accordingly, a preferred embodiment of the present invention uses a switch matrix adapted to selectively provide non-delayed or delayed versions of a signal to be simulcast to each antenna beam of the synthesized sector.

In order to provide the delays, the preferred embodiment includes delay elements associated with each signal of the sectors to be synthesized. Preferably, a switch selection is utilized to provide delay/non-delayed signals for each beam of the synthesized sector. Accordingly, a sector signal may be delayed by an associated delay element before being provided to a particular antenna beam of the antenna beams utilized to synthesize a sector. Therefore, a technical advantage of the present invention is that destructive combining of the wideband signals, whether digital or analogue, of multiple antenna beams used in synthesizing a desired sector radiation pattern is avoided.

The use of delays results in the addition of delay boundaries, as between the antenna beams having differing amounts of delay (or no delay) introduced into the simulcast signal. Such delay boundaries may create, for example, regions in which all demodulator fingers of a mobile unit's CDMA Rake receiver are utilized. Furthermore, the forward link performance may also be adversely affected, depending upon the relative strengths of the paths available relative to the amount of unrecovered energy acting as interference. Accordingly, it is desirable to introduce as few delay boundaries in the synthesized sector as possible while providing sufficient difference between the signals of the antenna beams in order to avoid destructive nulls. By intelligently selecting the antenna beams for which delayed versions of a signal are simulcast, the present invention operates so as not to adversely affect forward link performance.

Often ones of the multiple antenna beams of a multibeam antenna system are generated with a common phase center, i.e., a single antenna panel, such as a phased array, provides multiple antenna beams, often each associated with a different input of a beam forming matrix, from the same radiation elements. Because the same radiation elements are energized in various phase relationships to form the beams, each of these antenna beams has a common phase center. Assuming these antenna beams are otherwise calibrated to be in phase with each other, i.e., the respective signals experience substantially the same path lengths, signals simulcast over these beams having a common phase center should not destructively combine. Accordingly, the preferred embodiment of the present invention identifies antenna beams having a common phase center and does not introduce a delay as between these signals of a synthesized sector. Therefore, a technical advantage of the present invention is that introduction of unnecessary delay boundaries in the synthesized sector is avoided.

However, often multiple antenna beam sources must be utilized in order to provide the desired geographical coverage. For example, multiple ones of the above described phased array panels may be utilized to provide coverage in a full 360°. Synthesized sectors including antenna beams from multiple ones of these panels will generally not enjoy common phase centers due to the physical separation of the multiple panels. Therefore, in order to avoid destructive combining of signals simulcast over beams of these two panels, delays as between the antenna beam signals of each panel are preferably introduced. Accordingly, the preferred embodiment of the present invention identifies antenna beams not having a common phase center and introduces a delay as between these signals of a synthesized sector. As such, a single delay boundary is introduced in a synthesized sector including antenna beams of two panels. Therefore, a technical advantage of the present invention is that a minimum number of delay boundaries are introduced in the synthesized sector.

A further technical advantage of the present invention is that the differential delays across the panel boundaries provides limited forward link spatial diversity for the mobiles. In other words, where the present invention introduces delays, the result is not just eliminating nulls but is also providing a degree of spatial diversity on the forward link.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The present invention provides a system and method for avoiding destructive combining of signals simulcast over multiple antenna beams. Preferably, the antenna beams are contiguous, substantially non-overlapping, narrow antenna beams such as those shown in FIG. 1. However, the present invention is useful with any number of antenna beam configurations where destructive combining produces undesired nulls.

Figure 1:
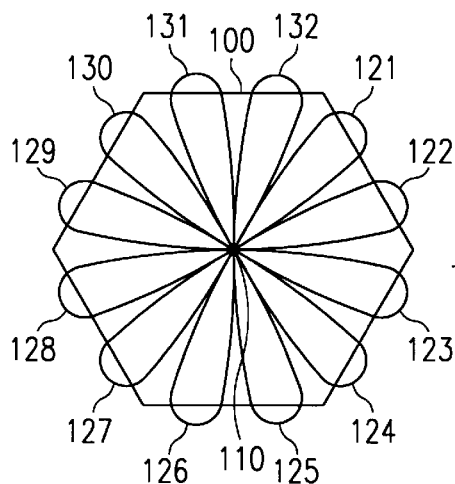
FIG. 1 shows multiple narrow antenna beams disposed to provide coverage within a predefined cell area.

The preferred embodiment of FIG. 1 includes twelve 30° antenna beams, antenna beams 121–132, radiating from BTS antenna structure 110 to illuminate the predefined area of cell 100. Of course, a greater or lesser number of antenna beams may be utilized according to the present invention, if desired. Furthermore, there is no limitation to the antenna beams being of substantially equivalent sizes, either in width or length.

Figure 2:
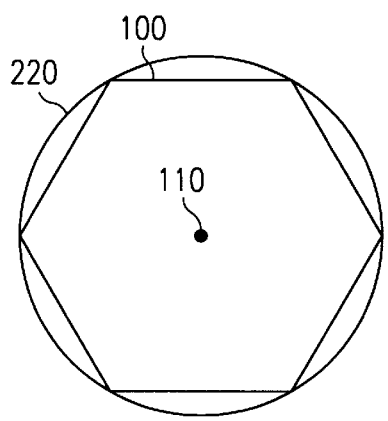
FIG. 2 shows a prior art omni cell radiation pattern.

It shall be appreciated that the preferred embodiment of FIG. 1 may be utilized to provide radiation of, as well as reception of, signals within various desired radiation patterns within cell 100. For example, a prior art omni cell radiation pattern, illustrated as antenna beam 220 of FIG. 2, may be synthesized by simulcasting a signal over antenna beams 120–132.

Figure 3:
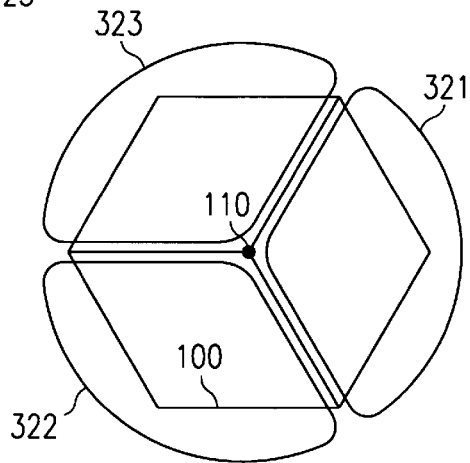
FIG. 3 shows a prior art three sectored cell radiation pattern.

Likewise, a prior art 120° sectored cell radiation pattern, illustrated as antenna beams 321–323 of FIG. 3 associated with an α, β and γ sector respectively, may be synthesized by simulcasting a signal associated with a particular sector over ones of the antenna beams. Specifically, the a sector, antenna beam 321, may be synthesized utilizing antenna beams 121–124. Likewise, the β and γ sectors, antenna beams 322 and 323 respectively, may be synthesized utilizing antenna beams 125–128 and 129–132 respectively.

Figure 4:
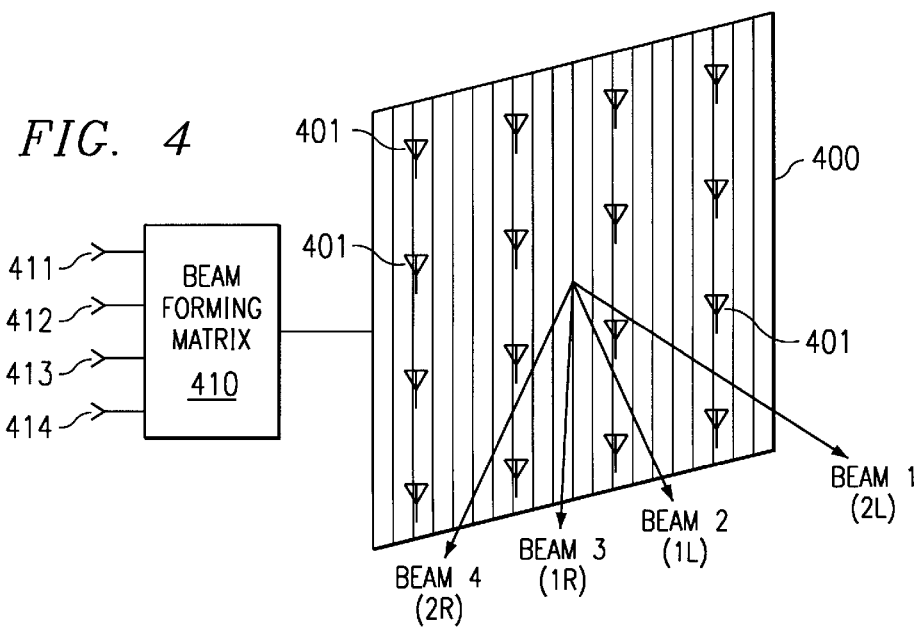
FIG. 4 shows a planar array adapted to provide multiple narrow antenna beams.

Preferably, ones of the antenna beams of the present invention are generated using an antenna panel such as that illustrated in FIG. 4. Of course, any number of antenna systems providing multiple antenna beams may be utilized according to the present invention, if desired. For example, modified panel arrays such as disclosed in the above referenced applications entitled "System and Method for Per Beam Elevation Scanning," "Multi-Sector Pivotal Antenna System and Method," and "Multiple Beam Planar Antenna Array with Parasitic Elements" may be utilized according to the present invention. Moreover, non-planar antennas, such as individual narrow beam antennas and conical multibeam antennas, such as disclosed in the above referenced application entitled "Conical Omni-Directional Coverage Multibeam Antenna with Multiple Feed Network," may be used, if desired.

Directing attention to the antenna array of FIG. 4, antenna elements 401 are arranged on panel 400 to provide multiple narrow beams; Beam 1 through Beam 4. In the preferred embodiment, the narrow antenna beams are formed by providing a signal to be radiated in a particular antenna beam to a corresponding input of beam forming matrix 410, i.e., inputs 411–414 correspond to Beam 1 through Beam 4 respectively. Beam forming matrix 410 may, for example, be a Butler matrix or other circuitry which provides the signal applied to one of the inputs as components with a proper phase progression at the elements of panel 400 to result in the desired narrow antenna beam. Beam forming matrixes, such as the aforementioned Butler matrix, are well known in the art and, therefore, will not be discussed in detail herein.

The antenna panel of FIG. 4, as well as other multibeam antenna systems, provides a convenient means by which a signal may be radiated within a predetermined area. For example, by providing a particular signal to input 411 of beam forming matrix 410, this signal will be radiated in the area associated with Beam 1. Likewise, by providing the signal to input 412 of beam forming matrix 410, the signal will be radiated in the area associated with Beam 2.

It shall be appreciated that, as each of beam of Beam 1 through Beam 4 are generated by excitation of the elements of panel 400, although utilizing a different phase progression there between, the phase centers of each of the antenna beams corresponding to the inputs of the beam forming matrix are the same, i.e., centered horizontally in the antenna panel face as illustrated in FIG. 4. Accordingly, if a radiation pattern larger than that of a single antenna beam is desired, a particular signal may be provided to multiple inputs of beam forming matrix 410 for radiation within the multiple corresponding antenna beams.

However, it shall be appreciated that both in generating the antenna beams through the use of a phased progression and in the radiation of a signal within multiple ones of the antenna beams there is a potential for destructive combining forming undesired nulls in the resulting radiation pattern caused by phase differences between the combined signals. There are two fundamentally different mechanisms that can create phase differences between the radiated signals of a multibeam antenna system: 1) path length differences, and 2) phase center differences.

Path length differences occur because the components in the transmit chain (cables, amplifiers, lightning arrestors, etc.) are not phase matched to one another, resulting in signals with differing phases being injected into the multibeam antenna inputs. Errors due to path length differences affect all applications, including both CDMA and AMPS/NAMPS applications.

A phase calibration approach, such as that shown in the above referenced application entitled "System and Method for Fully Self-Contained Calibration of an Antenna Array," may be implemented for phase nulls due to path length differences. However, the phase calibration approach cannot address the second source of nulls caused by phase center differences.

Phase center differences occur if the desired radiation pattern, such as a synthesized sector pattern, includes antenna beams generated from exciting different antenna elements, such as when antenna beams from different antenna panels are used in the synthesized pattern. Since the antenna panels generating the antenna beams are physically separate, the distance between the panels induces a phase difference as between antenna beams of different panels in the composite signal including these different antenna beams.

Figure 5:
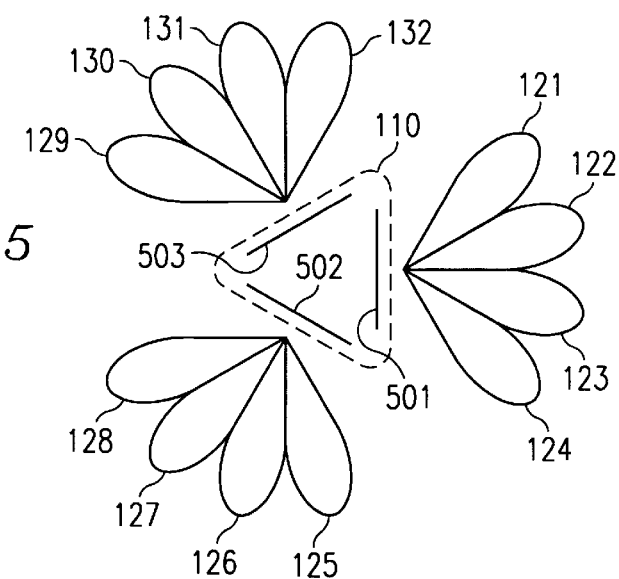
FIG. 5 shows a plurality of planar arrays, such as that of FIG. 4, deployed to provide multiple narrow antenna beams, such as those of FIG. 1.

For example, directing attention to FIG. 5, in order to provide the 360° coverage of cell 100 as shown in FIG. 1, multiple antenna panels as shown in FIG. 4 are deployed as panels 501–503 comprising BTS antenna structure 110. Beams of these different antenna panels may be utilized to radiate a signal within any area of cell 100 having a radiation pattern including any number of the antenna beams, i.e., beam mapping and sector synthesizing. Systems and methods for providing dynamic beam mapping are shown in the above referenced application entitled "Antenna Deployment Sector Cell Shaping System and Method."

From analysis of computer models and experimental measurements of the quality of the synthesized antenna patterns for CDMA RF beam mapping, it has been discovered that the phase calibration approach, addressing the phase differences due to path length differences does not always result in a desired composite radiation pattern where antenna beams having different phase centers are utilized. Moreover, if phase calibration alone is performed, the synthesized patterns for CDMA steered sectors contain nulls that are deeper than those associated with an analogue signal provided in a synthesized radiation pattern including antenna beams having different phase centers, such as where a AMPS/NAMPS signaling channel is provided on all antenna beams. Although it is likely that, in real world deployments, many of these theoretical nulls will be completely or partially filled due to local scattering, near field effects, and multipath, the risk of a composite radiation pattern having undesired nulls remains.

The preferred embodiment of the present invention utilizes delay elements to avoid nulls in synthesized patterns including antenna beams from across panels, or otherwise are associated with different phase centers, in combination with phase calibration to avoid nulls caused by path length differences. Of course, the delays of the present invention may be utilized without the aforementioned phase calibration, although nulls created by the phase differences due to path length differences would not be addressed. However, where phase calibration cannot be performed or is otherwise unavailable, the present invention can operate to introduce alternating delay/non-delay signals in the antenna beams of a synthesized sector in order to mitigate the effects of nulling due to path length differences as well as phase center differences. For example, where antenna beams 121–124 of FIG. 5 are utilized to synthesize a sector, signals of antenna beams 121 and 123 may be delayed whereas the signal of antenna beams 122 and 124 are not.

Figure 6:
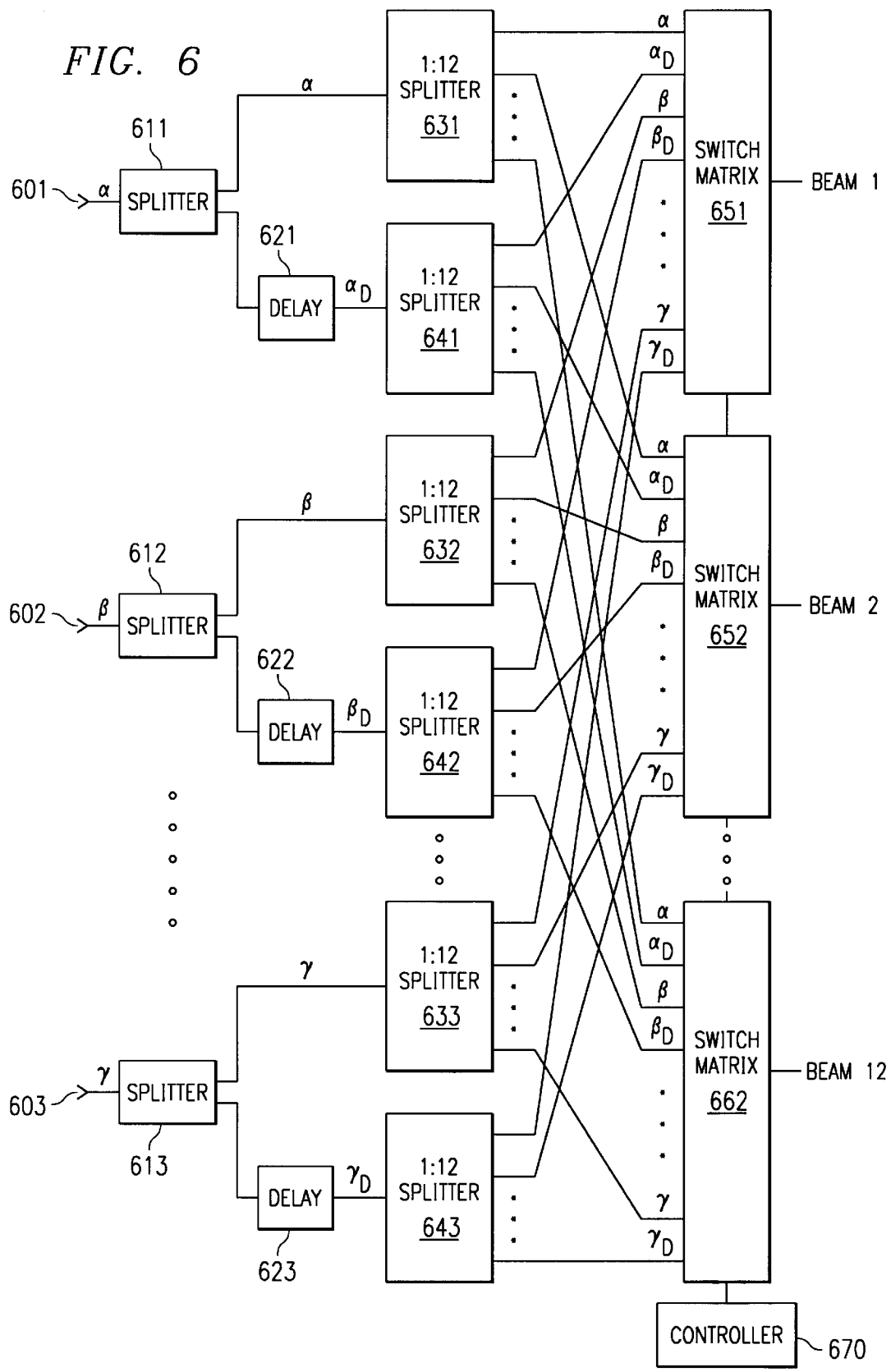
FIG. 6 shows a preferred embodiment of circuitry adapted to provide the delay differentials of the present invention.

Directing attention to FIG. 6, a preferred embodiment of the present invention is shown. Inputs 601–603, associated with the signals to be radiated in a particular synthesized sector, are provided for coupling signals to the desired ones of the multiple antenna beams. Here Beam 1 through Beam 12 correspond to antenna beams 121–132 of FIG. 1. It shall be appreciated that, although three inputs are shown, associated with synthesized sectors $\alpha$, $\beta$ and $\gamma$, any number of such inputs may be utilized according to the present invention through the expedient of scaling the circuitry shown in FIG. 6 accordingly (as indicated by the ellipsis). Likewise, although beam 1 through beam 12 are shown, the present invention may be scaled to provide synthesized sector signals to any number of antenna beams through scaling of the circuitry shown in FIG. 6.

Coupling of signals provided at inputs 601–603 to the antenna beams is provided by input splitters 611–613, each coupled to a synthesized sector input signal, delay devices 621–623, each coupled to one output of a corresponding input splitter, antenna beam splitters 631–633, each coupled to one output of a corresponding input splitter, delay antenna beam splitters 641–643, each coupled to one output of a corresponding delay device, and switch matrixes 661–662 (switch matrixes 653–661 being represented by the ellipsis), each coupled to one output of each antenna beam splitter and each delay antenna beam splitter and providing selective output to a corresponding one of Beam 1 through Beam 12. The outputs of switch matrixes 651–662 are each associated with an antenna beam input of a multibeam antenna, or antennas, such as illustrated in FIG. 4. For example, the output of switch matrix 651 may be coupled to input 411, and thus Beam 1, of antenna panel 400 while the output of switch matrix 652 is coupled to input 412, and thus Beam 2, of antenna panel 400. Accordingly, through control of switch matrixes 651–662, various ones of the signals input at inputs 601–603 may be provided for radiation within beams 121–132. Moreover, as delay is provided in the signal paths of the input signals, a delay differential between the signal as provided to ones of the antenna beams may be introduced to avoid destructive nulling by selection at the switch matrixes the appropriate delayed or non-delayed signal.

Although control of switch matrixes 651–662 to couple a particular signal, having a delayed or non-delayed attribute, may be accomplished by many means, including manual operation of the switch matrixes, a preferred embodiment utilizes control circuitry to automatically control switch matrixes 651–662. Accordingly, controller 670, having control circuitry associated therewith, is coupled to switch matrixes 651–662. It shall be understood that, although a single control interface is illustrated between all of the switch matrixes, each of these switch matrixes may be controlled independently by controller 670. Of course, controller 670 need not be a discrete component associated with a particular BTS antenna system, but may instead be an integral part of the cell's existing control circuitry or a part of the control circuitry for a plurality of such cells.

Controller 670 may comprise a processor-based system having a processing unit (CPU) and memory associated therewith (RAM). The RAM may have stored therein an algorithm operable to cause the CPU to operate the switch matrixes of the present invention to couple the various antenna beams to ones of the inputs as determined advantageous for communications provided by the system.

The preferred embodiment of the present invention illustrated in FIG. 6 is flexible in that it may be operated in a number of ways to introduce delay differentials between a signal as provided to ones of the antenna beams. Specifically, the preferred embodiment may be operated to insert the absolute minimum number of delays (the advantages of which will be discussed hereinbelow) necessary to reduce the impacts of nulls between panels.

Figure 7:
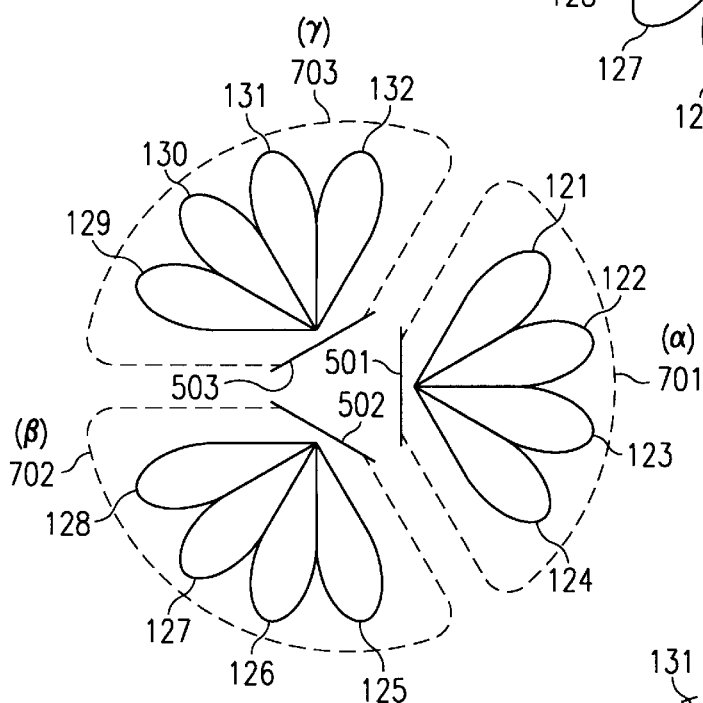
FIGS. 7–10 show sector synthesis according to the present invention.

The present invention may be operated to provide delay differentials to avoid destructive combining by alternating the use of delay/non-delay signals for adjacent antenna beams. For example, in a synthesized sector ($\alpha$) including beams 121–124, such as shown in FIG. 7, the signal input at input 601 may be selected by switch matrixes 651 and 653 (represented by the ellipsis) for provision to antenna beams 121 and 123 without a delay ($\alpha$ signal from splitter 631) and by switch matrixes 652 and 654 (represented by the ellipsis) for provision to antenna beams 122 and 124 with a delay ($\alpha_D$ signal from splitter 641). However, this is not the most advantageous allocation of the delay elements.

The alternating delay/non-delay method of introducing delay differentials, although simple to implement and useful in also compensating for path length differences, may produce unnecessary delay boundaries. For example, the above described synthesized sector includes three delay boundaries without considering any delay boundaries created by other synthesized sectors (a total of nine delay boundaries where three 120° sectors are synthesized). However, where only antenna beams of a particular panel are utilized in any one synthesized sector, no delay elements are required as there is a common phase center for each of these antenna beams. The delay boundaries, being seen at the mobile as multiple signals delayed in time and thus possibly appearing in different fingers of a CDMA Rake receiver, may impact system performance by tying up all of a mobile's demodulators.

Accordingly, when operated to provide synthesis of the three 120° sectors shown in FIG. 3, without azimuth steering, i.e., only antenna beams of a particular panel are utilized in any one sector, the present invention operates to utilize no delay elements in the transmitted signals as there is a common phase center for each of these antenna beams. However, as synthesized sector patterns are steered across panel boundaries (as will be discussed in more detail hereinbelow), appropriate delay elements are inserted in the transmit paths. Therefore, the preferred embodiment of the present invention is operated to insert the absolute minimum number of delays necessary to avoid the undesired nulls. In the worst case, where all sector patterns are generated from beams on the three separate panels shown in FIGS. 8 and 9, only three delay/non-delay boundaries would be created in the cell according to the preferred embodiment.

Even utilizing the present invention to provide the absolute minimum number of delay differentials necessary to avoid destructive combining, operating conditions may still produce situations in which all mobile Rake fingers are utilized. For example, mobile Rake demodulator utilization may be a problem in multiple pilot regions and areas with extensive multipath returns. Additionally, the deployment of clusters of many closely-spaced cells utilizing sector mapping could have an impact on demodulator utilization.

However, if situations arise where the addition of delay/non-delay boundaries creates regions in which all mobile Rake fingers are utilized, the forward link performance may or may not be adversely affected, depending upon the relative strengths of the paths available (that is, the amount of unrecovered energy that acts as interference). Current CDMA mobiles incorporate a fixed number of Rake demodulators. Accordingly, the mobile receivers can re-assign Rake fingers on a rapid basis. Since the mobiles can rapidly re-assign demodulators, interference due to unrecovered energy should only become a problem if, of the strongest paths, four or more occur with similar amplitudes for extended periods.

Additionally, in such areas (clusters of cells utilizing beam mapping, pilot pollution, heavy multipath), it should be possible to adjust network parameters (per-beam transmit powers, handoff thresholds, search windows, etc.) in order to reduce the number of fingers in lock. Such an approach would require a change in network parameters associated with particular beam-to-sector mappings.

It should be appreciated that operation of the present invention to utilize beams having a different phase center, by introducing differential delays between the beams having the different phase centers, provides limited forward link spatial diversity for the mobiles, similar to softer handoff benefit. Accordingly, in all areas where the preferred embodiment of the present invention introduces delays, the result is not just to eliminate nulls, but to also provide a degree of spatial diversity in the forward link.

As described above, if sector azimuth beam widths or bore sights are adjusted so that synthesized sector radiation patterns including antenna beams having different phase centers, i.e., antenna beams from across panel boundaries, are required, delay elements are inserted such that all the signals of antenna beams having a particular phase center, such as all signals provided to a panel as illustrated in FIG. 5, are either delayed or non-delayed. In order to better understand the use of delays for avoiding undesired nulls according to the preferred embodiment of the present invention, examples of various synthesized sectors are given hereinbelow.

Directing attention to FIG. 7, synthesis of the three 120° sectors shown in FIG. 3, without azimuth steering, is shown as α sector 701, β sector 702, and γ sector 703. As all antenna beams utilized in synthesizing a particular sector in this example are generated by the same panel (have the same phase center) the present invention utilizes no delay elements in the transmitted signals. Accordingly, there are no delay/non-delay boundaries in this example.

With reference to FIG. 6, this radiation pattern may be generated by providing an α signal to input 601 and controlling switch matrixes 651–654 to couple the non-delayed α signal to antenna beams 121–124, providing a β signal to input 602 and controlling switch matrixes 655–658 to couple the non-delayed β signal to antenna beams 125–128, and providing a γ signal to input 603 and controlling switch matrixes 659–662 to couple the non-delayed γ signal to antenna beams 129–132. This relationship is shown in the table below.

| Antenna Beam | Sector Synthesis Mapping |
| --- | --- |
| Antenna Panel 501 - Beam 121 (2L) | Alpha Non-Delayed (α) |
| Antenna Panel 501 - Beam 122 (1L) | Alpha Non-Delayed (α) |
| Antenna Panel 501 - Beam 123 (1R) | Alpha Non-Delayed (α) |
| Antenna Panel 501 - Beam 124 (2R) | Alpha Non-Delayed (α) |
| Antenna Panel 502 - Beam 125 (2L) | Beta Non-Delayed (β) |
| Antenna Panel 502 - Beam 126 (1L) | Beta Non-Delayed (β) |
| Antenna Panel 502 - Beam 127 (1R) | Beta Non-Delayed (β) |
| Antenna Panel 502 - Beam 128 (2R) | Beta Non-Delayed (β) |
| Antenna Panel 503 - Beam 129 (2L) | Gamma Non-Delayed (γ) |
| Antenna Panel 503 - Beam 130 (1L) | Gamma Non-Delayed (γ) |
| Antenna Panel 503 - Beam 131 (1R) | Gamma Non-Delayed (γ) |
| Antenna Panel 503 - Beam 132 (2R) | Gamma Non-Delayed (γ) |

Figure 8:
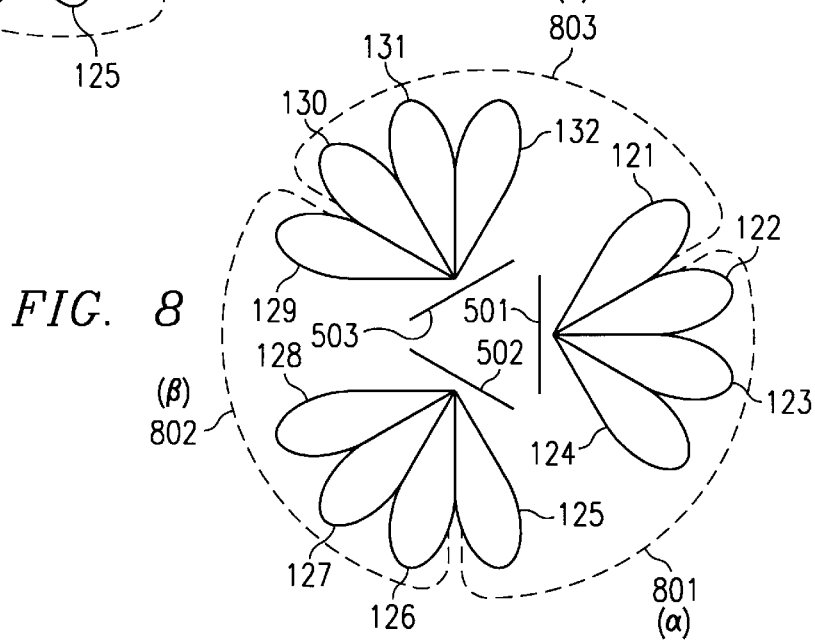

Directing attention to FIG. 8, synthesis of three 120° sectors as shown in FIG. 3, with azimuth steering resulting in a 30° clockwise shift in the sector orientation, is shown as α sector 801, β sector 802, and γ sector 803. As some of the antenna beams utilized in synthesizing a particular sector in this example are generated by different panels (have different phase centers) the present invention utilizes delay elements in the transmitted signals. Accordingly, there are three delay/non-delay boundaries in this example.

With reference to FIG. 6, this radiation pattern may be generated by providing an α signal to input 601 and controlling switch matrixes 652–654 to couple the non-delayed α signal to antenna beams 122–124 and controlling switch matrix 655 to couple the delayed α signal to antenna beam 125, providing a β signal to input 602 and controlling switch matrixes 656–658 to couple the non-delayed β signal to antenna beams 126–128 and controlling switch matrix 659 to couple the delayed β signal to antenna beam 129, and providing a γ signal to input 603 and controlling switch matrixes 660–662 to couple the non-delayed γ signal to antenna beams 130–132 and controlling switch matrix 651 to couple the delayed γ signal to antenna beam 121. This relationship is shown in the below table.

| Antenna Beam Description | Sector Synthesis Mapping |
| --- | --- |
| Panel 501 - Beam 121 (2L) | Gamma Delayed ($\gamma_D$) |
| Panel 501 - Beam 122 (1L) | Alpha Non-Delayed (α) |
| Panel 501 - Beam 123 (1R) | Alpha Non-Delayed (α) |
| Panel 501 - Beam 124 (2R) | Alpha Non-Delayed (α) |
| Panel 502 - Beam 125 (2L) | Alpha Delayed ($\alpha_D$) |
| Panel 502 - Beam 126 (1L) | Beta Non-Delayed (β) |
| Panel 502 - Beam 127 (1R) | Beta Non-Delayed (β) |
| Panel 502 - Beam 128 (2R) | Beta Non-Delayed (β) |
| Panel 503 - Beam 129 (2L) | Beta Delayed ($\beta_D$) |
| Panel 503 - Beam 130 (1L) | Gamma Non-Delayed (γ) |
| Panel 503 - Beam 131 (1R) | Gamma Non-Delayed (γ) |
| Panel 503 - Beam 132 (2R) | Gamma Non-Delayed (γ) |

Figure 9:
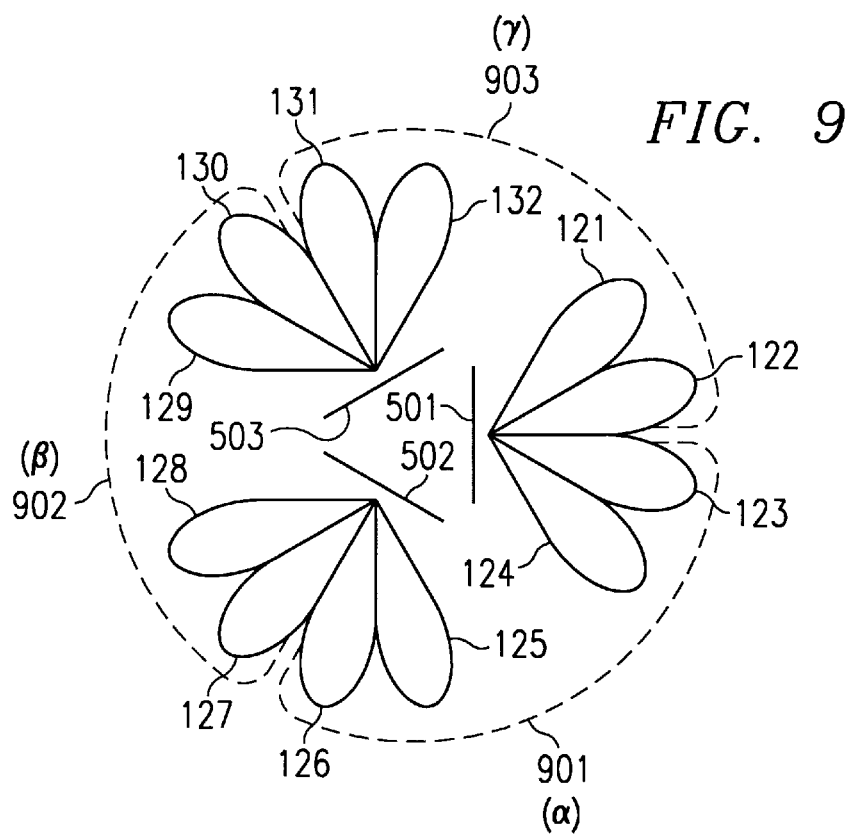

Directing attention to FIG. 9, synthesis of three 120° sectors as shown in FIG. 3, with azimuth steering resulting in a 60° clockwise shift in the sector orientation, is shown as α sector 901, β sector 902, and γ sector 903. As in the example above, some of the antenna beams utilized in synthesizing a particular sector in this example are generated by different panels (have different phase centers) and, therefore, the present invention utilizes delay elements in the transmitted signals. Accordingly, there are also three delay/non-delay boundaries in this example.

With reference to FIG. 6, this radiation pattern may be generated by providing an α signal to input 601 and controlling switch matrixes 653 and 654 to couple the non-delayed α signal to antenna beams 123 and 124 and controlling switch matrixes 655 and 656 to couple the delayed α signal to antenna beams 125 and 126, providing a β signal to input 602 and controlling switch matrixes 657 and 658 to couple the non-delayed β signal to antenna beams 127 and 128 and controlling switch matrixes 659 and 660 to couple the delayed β signal to antenna beams 129 and 130, and providing a γ signal to input 603 and controlling switch matrixes 661 and 662 to couple the non-delayed γ signal to antenna beams 131 and 132 and controlling switch matrixes 651 and 652 to couple the delayed γ signal to antenna beams 121 and 122. This relationship is shown in the below table.

| Antenna Beam Description | Sector Synthesis Mapping |
|---|---|
| Panel 501 - Beam 121 (2L) | Gamma Delayed ($\gamma_D$) |
| Panel 501 - Beam 122 (1L) | Gamma Delayed ($\gamma_D$) |
| Panel 501 - Beam 123 (1R) | Alpha Non-Delayed ($\alpha$) |
| Panel 501 - Beam 124 (2R) | Alpha Non-Delayed ($\alpha$) |
| Panel 502 - Beam 125 (2L) | Alpha Delayed ($\alpha_D$) |
| Panel 502 - Beam 126 (1L) | Alpha Delayed ($\alpha_D$) |
| Panel 502 - Beam 126 (1R) | Beta Non-Delayed ($\beta$) |
| Panel 502 - Beam 127 (2R) | Beta Non-Delayed ($\beta$) |
| Panel 503 - Beam 129 (2L) | Beta Delayed ($\beta_D$) |
| Panel 503 - Beam 130 (1L) | Beta Delayed ($\beta_D$) |
| Panel 503 - Beam 131 (1R) | Gamma Non-Delayed ($\gamma$) |
| Panel 503 - Beam 132 (2R) | Gamma Non-Delayed ($\gamma$) |

It shall be appreciated that the present invention is not limited to the 120° synthesized sectors used in the above examples. Any size sector, limited only by the size and number of the individual antenna beams forming the composite radiation pattern, may be synthesized according to the present invention. Directing attention to FIG. 10, synthesis of sectors other than the aforementioned 120° sectors is shown.

Figure 10:
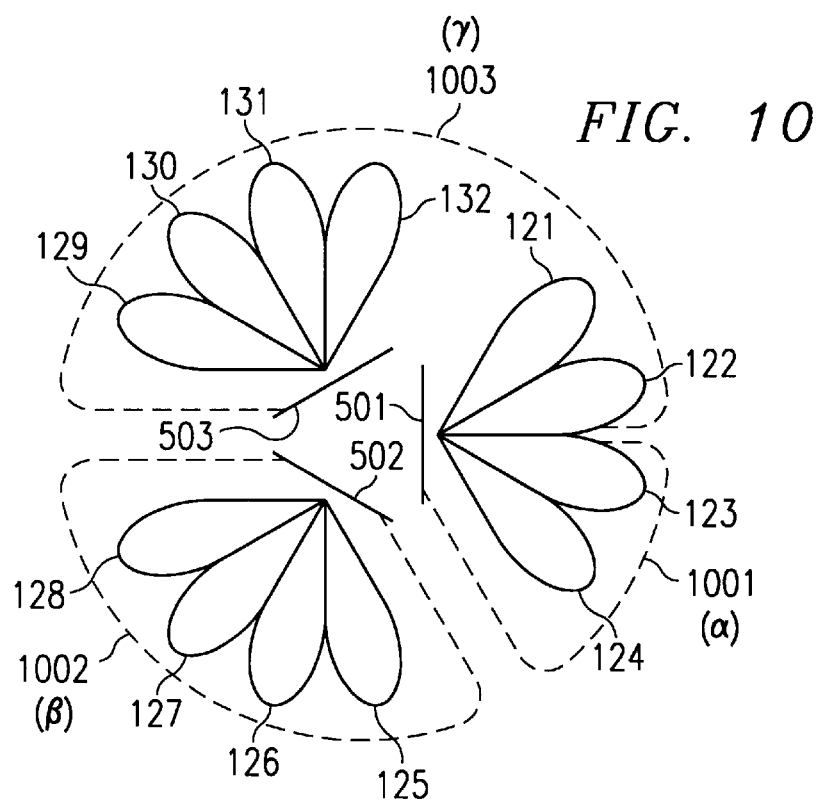

FIG. 10 shows synthesis of three sectors wherein an $\alpha$ sector 1001 has a 60° azimuthal width, a $\beta$ sector 1002 has a 120° azimuthal width, and a $\gamma$ sector 1003 has a 180° azimuthal width. Accordingly, some of the antenna beams utilized in synthesizing the $\gamma$ sector in this example are generated by different panels (have different phase centers) and, therefore, the present invention utilizes delay elements in the transmitted signals. Accordingly, there is one delay/non-delay boundaries in this example.

With reference to FIG. 6, this radiation pattern may be generated by providing an $\alpha$ signal to input 601 and controlling switch matrixes 653 and 654 to couple the non-delayed $\alpha$ signal to antenna beams 123 and 124, providing a $\beta$ signal to input 602 and controlling switch matrixes 655–658 to couple the non-delayed $\beta$ signal to antenna beams 125–128, and providing a $\gamma$ signal to input 603 and controlling switch matrixes 659–662 to couple the non-delayed $\gamma$ signal to antenna beams 129–132 and controlling switch matrixes 651 and 652 to couple the delayed $\gamma$ signal to antenna beams 121 and 122. This relationship is shown in the below table.

| Antenna Beam Description | Sector Synthesis Mapping |
|---|---|
| Panel 501 - Beam 121 (2L) | Gamma Delayed ($\gamma_D$) |
| Panel 501 - Beam 122 (1L) | Gamma Delayed ($\gamma_D$) |
| Panel 501 - Beam 123 (1R) | Alpha Non-Delayed ($\alpha$) |
| Panel 501 - Beam 124 (2R) | Alpha Non-Delayed ($\alpha$) |
| Panel 502 - Beam 125 (2L) | Beta Non-Delayed ($\beta$) |
| Panel 502 - Beam 126 (1L) | Beta Non-Delayed ($\beta$) |
| Panel 502 - Beam 127 (1R) | Beta Non-Delayed ($\beta$) |
| Panel 502 - Beam 128 (2R) | Beta Non-Delayed ($\beta$) |
| Panel 503 - Beam 129 (2L) | Gamma Non-Delayed ($\gamma$) |
| Panel 503 - Beam 130 (1L) | Gamma Non-Delayed ($\gamma$) |
| Panel 503 - Beam 131 (1R) | Gamma Non-Delayed ($\gamma$) |
| Panel 503 - Beam 132 (2R) | Gamma Non-Delayed ($\gamma$) |

Application of delays according to the preferred embodiment of the present invention, such that pattern nulls are reduced and the CDMA mobiles encounter the minimum number of delay/non-delay boundaries, may be summarized as follows: Delays are not necessary for any sector synthesized from beams having a common phase center, i.e., contained totally within a single antenna panel. For any sector synthesized across antenna panels, delay changes are used only as between beams having a different phase center, i.e., antenna beams at the panel boundaries. Where a delay is used for an antenna beam having a particular phase center, all antenna beams with that phase center should also have a delay associated with the particular signal, i.e., all antenna beams on a particular antenna panel used in synthesizing a sector should have the same delay or non-delay.

With an approach as outlined above, the number of delay/non-delay boundaries created by an antenna system such as illustrated in FIG. 5 will range from zero (where all antenna beams of synthesized sectors have a common phase center) to three (where the antenna beams of all synthesized sectors include different phase centers). For comparison, alternating beam delay/non-delay, as described above, in a system such as illustrated in FIG. 5 always produces nine delay/non-delay boundaries (excluding sector handoff boundaries).

In order to be effective in a typical CDMA cellular system, the delay elements shown in FIG. 6 should provide greater than 1 chip duration (Tc) of delay (D) at the CDMA carrier frequency. Because Rake receivers typically implement a duplicate detection algorithm to identify path components spaced too close in time to distinguish, the delay (D) should actually be somewhat greater than the chip duration (Tc) to avoid false alarms. In order to comply with the IS-95A standard, the cell site should transmit signals within ±3 $\mu$sec of GPS time, and must transmit signals within ±10 $\mu$sec of GPS time. To provide effective performance and simultaneously comply with the recommended ±3 $\mu$sec of GPS time in the standard, the constraint on the delay is 0.81 $\mu$sec<D<3 $\mu$sec. Accordingly, a value of D=2 or 2.5 $\mu$sec, selected from the middle of the acceptable range, is a preferred amount of delay to introduce according to the present invention.

The delay elements, if the delay value D is greater than the chip duration Tc, cause the phase cancellation observed at a mobile unit to become frequency selective (multiple narrow fades within the signal bandwidth). If the delay elements were not present, the phase nulling observed at the mobile unit would be flat faded (the entire signal bandwidth would be attenuated). In a CDMA system, advantage may be taken of the fact that the mobile units have multiple demodulator elements (Rake fingers). By introduction of the delay element, as long as D is greater than Tc, the mobile unit can assign separate demodulators to the non-delayed and the delay paths.

By introducing the delay element, the nulling (also called fading) across the signal bandwidth can be made frequency selective versus flat faded. As such, the introduction of the delay element can result in more average energy across the signal bandwidth, because with the delay element the width of the nulls as function of frequency is significantly less than the signal bandwidth (BW~=1/Tc). Without the delay element, the width of the nulls as a function of frequency can be much greater than the signal bandwidth, resulting the possibility that the entire signal is highly attenuated. In a spread spectrum communication system, such a CDMA, it is possible for the receiver to perform well in a frequency selective fading (nulling) environment due to the fact that the Rake receiver provides multiple demodulator elements that can receive signals at different time delays.

The delay element of the present invention may be any form device adapted to introduce an amount of delay in the signals to be communicated. For example, a predetermined length of cable, a surface acoustic wave (SAW) device, or a digital signal processor (DSP) may be utilized according to the present invention.

Figure 11:
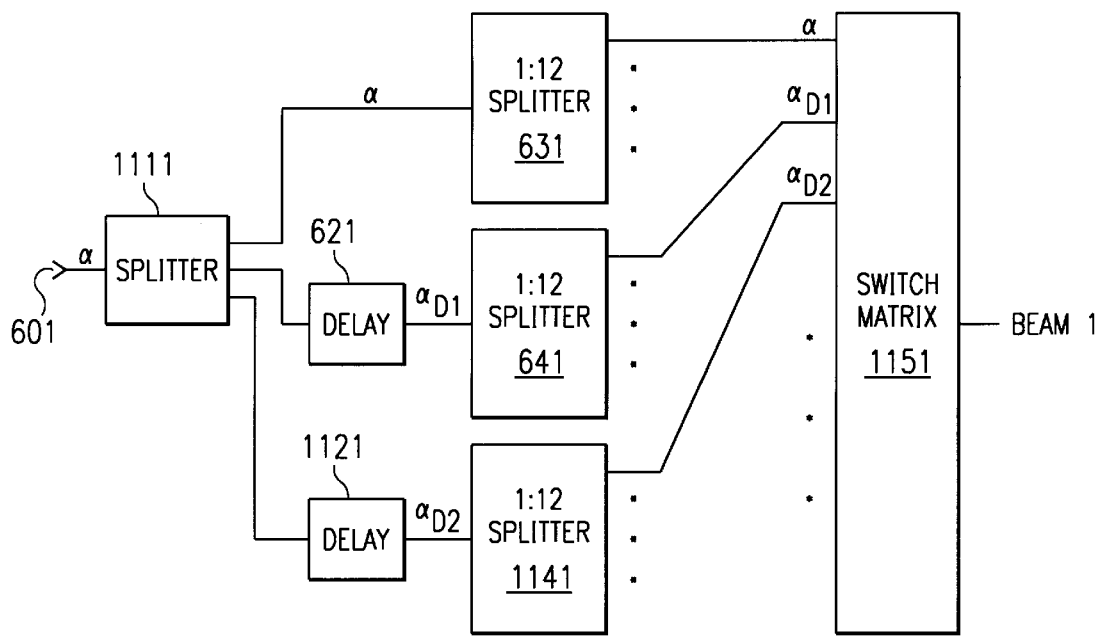
FIG. 11 shows an alternative embodiment of a portion of the circuitry of FIG. 6 wherein multiple delays are provided for an input signal.

Although a preferred embodiment utilizing one delay element for each sector to be synthesized has been shown, different numbers of delay elements may be utilized according to the present invention. For example, where it is anticipated that a synthesized sector will provide 360° coverage, i.e., utilize all antenna beams shown in FIG. 5, multiple delay elements may be associated with this sector's signal. Directing attention to FIG. 11, a portion of the circuitry of the preferred embodiment of FIG. 6 is shown wherein an additional delay element is associated with α input 601. In this alternative embodiment, splitter 1111 provides the signal of input 601 not only to splitter 631 and through delay 621 to splitter 641, but also through delay 1121 to splitter 1141. The switch matrixes associated with the various antenna beams can select as between a non-delayed signal and a signal having one of two possible delays. This is shown by switch matrix 1151 adapted to accept the additional signals associated with additional delay elements. Accordingly, a sector including each of the antenna beams could be synthesized where a delay differential is introduced as between the antenna beams of each panel of FIG. 5, i.e. non-delayed α signal provided to antenna beams 121–124, delayed $α_{D1}$ signal provided to antenna beams 125–128, and delayed $α_{D2}$ signal provided to antenna beams 129–132.

Moreover, although a same amount of delay for the delay elements associated with each input has been discussed herein, it shall be appreciated that there is no such limitation of the present invention. For example, different delays associated with synthesized sectors utilizing antenna beams not having a common phase center (i.e. a synthesized sector utilizing two antenna panels) may be utilized in order to provide both the delay differential to avoid nulling within a synthesized sector as well as reduced interference in an adjacent synthesized sector, also including the use of delays for antenna beams having different phase centers, by causing the signals of the adjacent sectors to be demodulated in different fingers of the Rake receiver.

Figure 12:
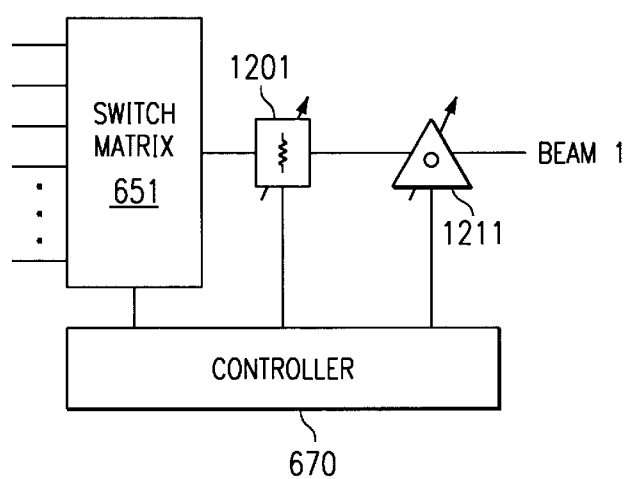
FIG. 12 shows an alternative embodiment of a portion of the circuitry of FIG. 6 wherein amplitude and phase adjustment is provided for the antenna beams.

Additionally, it should be appreciated that where less than all the narrow beams emanating from a panel antenna, such as that illustrated in FIG. 4, are combined, the size of the composite beam is slightly less that the sum of the individual antenna beams. This is due to the beam forming matrix being designed for the delivery of multiple antenna beams and the phase and amplitude losses associated therewith. Accordingly, an alternative embodiment of the present invention utilizes phase and amplitude adjustments to adjust the beam width and shape of the composite beams when the individual narrow beams come from the same panel antenna. This is illustrated in FIG. 12 as attenuator/amplifier 1201 and phase shifter 1211 disposed in the signal path of antenna beam 121.

It shall be appreciated that, although the present invention has been described herein with reference to a cellular wireless communication system, there is no such limitation with respect to the present invention. The advantages of the present invention are useful in any number of communication systems wherein multiple antenna beams are utilized to simulcast a signal.

Furthermore, although the present invention has been discussed in the forward link, it shall be appreciated that the systems and methods described herein are also suitable for use in the reverse link to avoid destructive combining of a signal as received in multiple antenna beams.

Although the present invention and its advantages have been described in detail, it should be understood that various changes, substitutions and alterations can be made herein without departing from the spirit and scope of the invention as defined by the appended claims.

What is claimed is:

1. A system for avoiding nulls in a composite radiation pattern formed from a plurality of antenna beams each simulcasting a same signal, the system comprising:

means for providing a delayed version and a non-delayed version of the signal;

means for selectively coupling the delayed version of the signal to ones of the plurality of antenna beams;

means for selectively coupling the non-delayed version of the signal to other ones of the plurality of antenna beams to thereby avoid destructive combining of radiated signals; and means for selecting the ones of the plurality of antenna beams to couple the delayed version of the signal to and the other ones of the plurality of antenna beams to couple the non-delayed version of the signal to at least in part as a function of a determination of a minimum number of delay boundaries between the antenna beams capable of avoiding destructive combining of radiated signals.

2. The system of claim 1, wherein the determination of a minimum number of delay boundaries includes identifying the antenna beams of the desired composite radiation pattern having a same preselected attribute.

3. The system of claim 2, wherein the ones of the plurality of antenna beams to which the delayed version of the signal is coupled by the first mentioned coupling means each have a same preselected first attribute, and wherein the other ones of the plurality of antenna beams to which the non-delayed version of the signal is coupled by the second mentioned coupling means each have a same preselected second attribute.

4. The method of claim 2, wherein the predetermined attribute is a same phase center.

5. The system of claim 1, further comprising:

means for selecting the ones of the plurality of antenna beams to couple the delayed version of the signal to and the other ones of the plurality of antenna beams to couple the non-delayed version of the signal to at least in part as a function of a desired synthesized sector azimuth pointing direction.

6. The system of claim 5, wherein the synthesized sector azimuth pointing direction is selected to balance communication traffic loading across a plurality of sectors synthesized from said plurality of antenna beams.

7. The system of claim 5, wherein the synthesized sector azimuth pointing direction is selected to balance communication traffic loading across a plurality of cells in a cellular communication system.

8. The system of claim 1, wherein the ones of the plurality of antenna beams coupled by the means for selectively coupling the delayed version of the signal have a different phase center as compared to the other ones of the plurality of antenna beams coupled by the means for selectively coupling the non-delayed version of the signal.

9. The system of claim 8, wherein the phase center difference is at least in part caused by the plurality of antenna beams coupled by the means for selectively coupling the delayed version of the signal being associated with a first antenna array and the other ones of the plurality of antenna beams coupled by the means for selectively coupling the non-delayed version of the signal being associated with a second antenna array.

10. The system of claim 1, wherein the delayed signal version and non-delayed signal version means comprises a delay element disposed in the signal path to introduce a predetermined amount of delay.

11. The system of claim 10, wherein the delay element is selected from the group consisting of:
    a predetermined length of cable,
    a surface acoustic wave device, and
    a digital signal processor.

12. The system of claim 10, wherein the amount of delay introduced by the delay element is selected to be between 0.81 $\mu$sec and 3 $\mu$sec.

13. The system of claim 12, wherein the amount of delay introduced by the delay element is approximately 2 $\mu$sec.

14. The system of claim 12, wherein the amount of delay introduced by the delay element is approximately 2.5 $\mu$sec.

15. The system of claim 1, wherein both the selectively coupling means each comprise:
    a switch matrix coupled to the delayed version of the signal and to the non-delayed version of the signal, wherein the means for selectively coupling the delayed version of the signal passes the delayed version of the signal to a particular antenna beam of the plurality of antenna beams and the means for selectively coupling the non-delayed version of the signal passes the non-delayed version of the signal to another antenna beam of the plurality of antenna beams.

16. The system of claim 15, further comprising:
    a processor based controller coupled to the switch matrix of both the selectively coupling means, wherein the controller provides automated selection of signals passed by the switch matrix.

17. A system for avoiding nulls in a composite radiation pattern formed from a plurality of antenna beams each simulcasting a same signal, the system comprising:
    means for providing a delayed version and a non-delayed version of the signal;
    means for selectively coupling the delayed version of the signal to at least one of the plurality of antenna beams; and
    means for selectively coupling the non-delayed version of the signal to other ones of the plurality of antenna beams, wherein said ones of the plurality of antenna beams and said other ones of the plurality of antenna beams are alternate antenna beams and wherein at least one of the delayed version and the non-delayed version is selectively coupled to more than one of the plurality of antenna beams.

18. The system of claim 17, wherein at least one of said ones of the plurality of antenna beams and at least one of said other ones of the plurality of antenna beams is radiated from a common antenna array, and wherein said coupling the delayed version of the signal to alternate antenna beams is at least in part to avoid phase calibration of signals provided to said common antenna array.

19. The system of claim 17, wherein the delayed signal version and non-delayed signal version means comprises a delay element disposed in the signal path to introduce a predetermined amount of delay.

20. The system of claim 19, wherein the delay element is selected from the group consisting of:
    a predetermined length of cable,
    a surface acoustic wave device, and
    a digital signal processor.

21. The system of claim 17, wherein both the selectively coupling means each comprise:
    a switch matrix coupled to the delayed version of the signal and to the non-delayed version of the signal, wherein the means for selectively coupling the delayed version of the signal passes the delayed version of the signal to a particular antenna beam of the plurality of antenna beams and the means for selectively coupling the non-delayed version of the signal passes the non-delayed version of the signal to another antenna beam of the plurality of antenna beams.

22. The system of claim 21, further comprising:
    a processor based controller coupled to the switch matrix of both the selectively coupling means, wherein the controller provides automated selection of signals passed by the switch matrix.

23. A method for avoiding destructive combining of signals, the method comprising the steps of:
    accepting an input signal;
    splitting the input signal thereby providing a first rendition of the signal and a second rendition of the signal;
    delaying the second rendition of the signal thereby providing a delayed second rendition of the signal;
    providing the first rendition of the signal and the delayed second rendition of the signal to a coupling device having a plurality of inputs and a plurality of outputs, wherein said coupling device provides selectable signal path connections between ones of said plurality of inputs and ones of said plurality of outputs;
    operating the coupling device to pass the first rendition of the signal to predetermined ones of the plurality of outputs and to pass the delayed second rendition of the signal to predetermined other ones of the plurality of outputs;
    determining a minimum number of delay boundaries between the outputs capable of avoiding destructive combining of signals; and
    selecting the ones of the plurality of outputs to pass the first rendition of the signal to and the other ones of the plurality of the outputs to pass the second delayed rendition of the signal to at least in part as a function of the determination made in the determining step.

24. The method of claim 23, wherein the predetermined ones of the plurality of outputs and the predetermined other ones of the plurality of outputs are each associated with an antenna beam of a desired composite radiation pattern.

25. The method of claim 24, wherein the determining step comprises the step of:
    identifying the antenna beams of the desired composite radiation pattern having a common attribute.

26. The method of claim 25, wherein the first rendition of the signal are passed to ones of the antenna beams having a common attribute and the delayed second rendition of the signal are passed to other ones of the antenna beams having a common attribute at the operating step.

27. The method of claim 25, wherein the common attribute is a same phase center.

28. The method of claim 23, further comprising the steps of:
    determining if path length differences exist between a point of accepting the input signal and ones of the plurality of outputs;
    selecting alternating ones of the plurality of outputs as the ones of the plurality of outputs to pass the first rendition of the signal to and the other ones of the plurality of the outputs to pass the delayed second rendition of the signal to.

29. The method of claim 23, wherein the step of providing the first rendition of the signal and the delayed second rendition of the signal to a coupling device includes the steps of:

splitting the first rendition of the signal thereby providing a plurality of renditions of the first rendition of the signal; and splitting the delayed second rendition of the signal thereby providing a plurality of renditions of the delayed second rendition of the signal.

30. The method of claim 29, wherein the coupling device includes a plurality of switch matrixes each having a plurality of inputs and an output associated with a particular antenna beam, and wherein a signal of the plurality of renditions of the first rendition of the signal is provided to an input of the plurality of inputs of ones of the switch matrixes, and wherein a signal of the plurality of renditions of the delayed second rendition of the signal is provided to another input of the plurality of inputs of the ones of the switch matrixes.

31. An antenna feed system providing synthesis of a desired sector radiation pattern utilizing a plurality of narrow antenna beams simulcasting a sector signal, wherein the sector signal as simulcast by the narrow antenna beams is manipulated by the antenna feed system to prevent undesired nulling, the system comprising:

circuitry providing both a delayed first sector signal and a non-delayed first sector signal for selective communication to each of the narrow antenna beams; and a controller coupled to the circuitry operable to control the communication of the delayed first sector signal to first ones of the narrow antenna beams associated with a first sector to be synthesized and to control the communication of the non-delayed first sector signal to second ones of the narrow antenna beams associated with the first sector to be synthesized, wherein the first ones of the narrow antenna beams have a first phase center and the second ones of the narrow antenna beams have a second phase center.

32. The system of claim 31, wherein a first group of the plurality of narrow antenna beams are generated by a first antenna array and a second group of the plurality of narrow antenna beams are generated by a second antenna array, and wherein the first ones of the narrow antenna beams are of the first group and the second ones of the narrow antenna beams are of the second group.

33. The system of claim 31, wherein the circuitry comprises:

a delay element having a delay of between 0.81 $\mu$sec and 3 $\mu$sec associated therewith.

34. The system of claim 33, wherein the delay is approximately 2 $\mu$sec.

35. The system of claim 31, wherein the circuitry also provides both a delayed second sector signal and a non-delayed second sector signal for selective communication to each of the narrow antenna beams, wherein the controller is also operable to control the communication of the delayed second sector signal to third ones of the narrow antenna beams associated with a second sector to be synthesized and to control the communication of the non-delayed second sector signal to fourth ones of the narrow antenna beams associated with the second sector to be synthesized.

36. An antenna feed system providing synthesis of a desired sector radiation pattern utilizing a plurality of narrow antenna beams simulcasting a sector signal, wherein the sector signal as simulcast by the narrow antenna beams is manipulated by the antenna feed system to prevent undesired nulling, the system comprising:

circuitry providing both a delayed first sector signal and a non-delayed first sector signal for selective communication to each of the narrow antenna beams;

a controller coupled to the circuitry operable to control the communication of the delayed first sector signal to first ones of the narrow antenna beams associated with a first sector to be synthesized and to control the communication of the non-delayed first sector signal to second ones of the narrow antenna beams associated with the first sector to be synthesized, wherein the first ones of the narrow antenna beams have a first phase center and the second ones of the narrow antenna beams have a second phase center, and wherein selection by the controller of the first ones of the narrow antenna beams to couple the delayed first sector signal to and the second ones of the narrow antenna beams to couple the non-delayed first sector signal to is at least in part a function of a desired synthesized sector azimuth angle.

37. The system of claim 36, wherein the circuitry also provides both a delayed second sector signal and a non-delayed second sector signal for selective communication to each of the narrow antenna beams, wherein the controller is also operable to control the communication of the delayed second sector signal to third ones of the narrow antenna beams associated with a second sector to be synthesized and to control the communication of the non-delayed second sector signal to forth ones of the narrow antenna beams associated with the second sector to be synthesized.

38. The system of claim 37, wherein the synthesized sector azimuth angle is selected to balance communication traffic loading across said first synthesized sector and said second synthesized sector.

39. The system of claim 36, wherein the synthesized sector azimuth angle is selected to balance communication traffic loading across a plurality of cells in a cellular communication system.

40. A system for avoiding destructive combining of signals simulcast over a plurality of antenna beams, the system comprising:

a plurality of first splitters each associated with a particular signal input of a plurality of signal inputs;

a plurality of delay elements each of which is coupled to an output of a particular one of the plurality of first splitters;

a plurality of second splitters each of which is coupled to an output of a particular one of the plurality of first splitters;

a plurality of third splitters each of which is coupled to an output of a particular one of the plurality of delay elements; and a plurality of switch matrixes each associated with a particular antenna beam output of a plurality of antenna beam outputs, wherein an output of each of the plurality of second splitters and an output of each of the plurality of third splitters are coupled to each of the plurality of switch matrixes.

41. The system of claim 40, wherein each of the plurality of delay elements introduces a delay of between 0.81 $\mu$sec and 3 $\mu$sec in a signal passed therethrough.

42. The system of claim 40, wherein the plurality of first splitters consists of three splitters each having one input and two outputs.

43. The system of claim 42, wherein the plurality of second splitters consists of three splitters each having one input and twelve outputs, and wherein the plurality of third splitters consist of three splitters each having one input and twelve outputs.

44. The system of claim 43, wherein the plurality of switch matrixes consist of twelve switch matrixes each having twenty-four inputs switchable to one output.

45. The system of claim 40, further comprising:
a controller coupled to each of the plurality of switch matrixes, wherein the controller provides control signals to cause first ones of the plurality of switch matrixes to pass a non-delayed first signal associated with a first input of the plurality of signal inputs, and wherein the controller provides control signals to cause second ones of the plurality of switch matrixes to pass a delayed first signal associated with the first input of the plurality of signal inputs, wherein the delayed first signal is delayed with respect to the non-delayed first signal by the delay element of the plurality of delay elements associated with the first input of the plurality of signal inputs.

46. The system of claim 45, wherein the controller provides control signals to cause third ones of the plurality of switch matrixes to pass a non-delayed second signal associated with a second input of the plurality of signal inputs, and wherein the controller provides control signals to cause fourth ones of the plurality of switch matrixes to pass a delayed second signal associated with the second input of the plurality of signal inputs, wherein the delayed second signal is delayed with respect to the non-delayed second signal by the delay element of the plurality of delay elements associated with the second input of the plurality of signal inputs.

47. The system of claim 45, further comprising:
a plurality of signal amplitude adjuster elements each of which is coupled to an output of a particular one of the plurality of switch matrixes, wherein the controller is also coupled to each amplitude adjuster element, and wherein the controller provides control signals to cause ones of the amplitude adjuster elements to adjust an amplitude of a signal to provide a desired composite antenna beam size.

* * * * *